(12) United States Patent
Nemedi

(10) Patent No.: US 9,968,944 B2
(45) Date of Patent: May 15, 2018

(54) PARTS SEPARATOR

(71) Applicant: INTER-SOURCE RECOVERY SYSTEMS, Kalamazoo, MI (US)

(72) Inventor: William D. Nemedi, Paw Paw, MI (US)

(73) Assignee: INTER-SOURCE RECOVERY SYSTEMS, Kalamazoo, MI (US)

( * ) Notice: Subject to any disclaimer, the term of this patent is extended or adjusted under 35 U.S.C. 154(b) by 609 days.

(21) Appl. No.: 14/215,971

(22) Filed: Mar. 17, 2014

(65) Prior Publication Data

US 2014/0263007 A1 Sep. 18, 2014

Related U.S. Application Data

(60) Provisional application No. 61/793,079, filed on Mar. 15, 2013.

(51) Int. Cl.
| | |
|---|---|
| *B03C 1/30* | (2006.01) |
| *B07B 11/06* | (2006.01) |
| *B07B 4/02* | (2006.01) |
| *B03C 1/10* | (2006.01) |
| *B01D 33/72* | (2006.01) |

(52) U.S. Cl.
CPC ............ *B03C 1/30* (2013.01); *B01D 33/725* (2013.01); *B03C 1/10* (2013.01); *B07B 4/02* (2013.01); *B07B 11/06* (2013.01); *B03C 2201/18* (2013.01)

(58) Field of Classification Search
CPC ........... B03C 1/10; B03C 1/12; B03C 1/0332; B03C 1/247; B03C 1/286; B03C 1/30; B03C 2201/18; B03C 2201/20; B07B 11/06; B07B 4/02; B02C 18/18; B02C 18/14; B02C 18/24; B02C 18/2216; B02C 18/2291; B02C 2018/188; B01D 33/725; B24C 3/065; B24C 3/067; B24C 9/00; B24C 9/006; B24C 1/003
See application file for complete search history.

(56) References Cited

U.S. PATENT DOCUMENTS

| | | |
|---|---|---|
| 21,945 A | 11/1858 | Cox |
| 36,980 A | 11/1862 | Irvin |
| 485,571 A | 11/1892 | Barnard |

(Continued)

FOREIGN PATENT DOCUMENTS

| | | |
|---|---|---|
| CA | 506578 | 10/1954 |
| DE | 630756 | 6/1936 |

(Continued)

OTHER PUBLICATIONS

Chip Processing (Brochure), Inter-Source Recovery Systems, Inc. (circa 1999), 4 pages.

(Continued)

*Primary Examiner* — David C Mellon
(74) *Attorney, Agent, or Firm* — Marshall, Gerstein & Borun LLP

(57) ABSTRACT

A parts separator includes a chute having an inlet section defining a wet chip inlet opening, an outlet section defining a wet chip outlet opening adapted to be coupled to a centrifugal separator and a drop-out opening disposed between the inlet and outlet sections. The parts separator also includes a magnetic separator disposed outside the chute adjacent the drop-out opening.

19 Claims, 4 Drawing Sheets

(56) References Cited

U.S. PATENT DOCUMENTS

| | | |
|---|---|---|
| 913,377 A | 2/1909 | Grant |
| 1,003,138 A | 9/1911 | Hupner |
| 1,126,240 A | 1/1915 | McKenzie |
| 1,272,311 A | 7/1918 | Plaisted |
| 1,288,785 A | 12/1918 | Williams |
| 1,300,799 A | 4/1919 | Williams |
| 1,306,775 A | 6/1919 | Roberts |
| 1,362,973 A | 12/1920 | Vardell |
| 1,376,190 A | 4/1921 | Dean |
| 1,418,866 A | 6/1922 | Dennig |
| 1,421,731 A | 7/1922 | Shelton |
| 1,517,595 A | 12/1924 | Stebbins |
| 1,579,660 A | 4/1926 | Reilly |
| 1,597,261 A | 8/1926 | Bishop |
| 1,660,682 A | 2/1928 | Stebbins |
| 1,669,235 A | 5/1928 | Fenton |
| 1,781,790 A | 11/1930 | McKenzie |
| 1,888,372 A | 11/1932 | Bramwell |
| 1,987,640 A | 1/1935 | Rothgarn |
| 2,000,181 A | 5/1935 | Lessing et al. |
| 2,140,827 A | 12/1938 | Boag |
| 2,162,392 A | 6/1939 | Solomon et al. |
| 2,186,107 A | 1/1940 | Eissmann |
| 2,203,821 A | 6/1940 | Hinchman |
| 2,203,959 A | 6/1940 | Hammack |
| 2,210,103 A | 8/1940 | Stoner |
| 2,267,326 A | 12/1941 | Eissmann |
| 2,356,465 A | 8/1944 | McKenzie |
| 2,585,301 A | 2/1952 | Doss |
| 2,681,476 A | 6/1954 | Van Doorn |
| 2,681,477 A | 6/1954 | Van Doorn |
| 2,692,047 A | 10/1954 | Frevert |
| 2,731,151 A | 1/1956 | Hopper |
| 2,906,466 A | 9/1959 | Hopper |
| 2,908,391 A | 10/1959 | Frevert |
| 2,978,103 A | 4/1961 | Cowher, Sr. |
| 3,045,822 A * | 7/1962 | Cavanagh ............... B03C 1/12 209/219 |
| 3,058,590 A | 10/1962 | Larson et al. |
| 3,133,015 A * | 5/1964 | Cavanagh ............... B03C 1/10 209/219 |
| 3,356,213 A | 12/1967 | Weber |
| 3,360,125 A | 12/1967 | Horsey |
| 3,400,814 A | 9/1968 | Hobbs |
| 3,429,439 A * | 2/1969 | Weston ............... B03C 1/10 209/223.1 |
| 3,441,131 A | 4/1969 | Gebauer |
| 3,456,797 A * | 7/1969 | Marriott ............... B03C 1/12 210/195.1 |
| 3,630,353 A | 12/1971 | Seidel et al. |
| 3,655,043 A | 4/1972 | Wochnowski et al. |
| 3,690,335 A | 9/1972 | Ichimura et al. |
| 3,799,339 A | 3/1974 | Breitholtz et al. |
| 3,836,085 A | 9/1974 | Brown |
| 3,888,352 A | 6/1975 | Kulseth |
| 3,929,293 A | 12/1975 | Hahn et al. |
| 3,960,335 A | 6/1976 | Haberle |
| 3,998,741 A * | 12/1976 | Councell ............... B03C 1/12 209/222 |
| 4,000,858 A | 1/1977 | Rudzinski |
| 4,186,888 A | 2/1980 | Galanty |
| 4,205,799 A | 6/1980 | Brewer |
| 4,211,641 A | 7/1980 | Jager |
| 4,219,410 A | 8/1980 | Herder |
| 4,293,408 A | 10/1981 | Herder |
| 4,310,417 A | 1/1982 | Dudley et al. |
| 4,377,259 A | 3/1983 | Areaux et al. |
| 4,382,858 A | 5/1983 | Dudley |
| 4,424,891 A | 1/1984 | Dudley et al. |
| 4,441,995 A | 4/1984 | Dudley |
| 4,629,134 A | 12/1986 | Pennekamp |
| 4,691,871 A | 9/1987 | Mochizuki |
| 4,720,050 A | 1/1988 | Eberhardt |
| 4,772,380 A | 9/1988 | Cramer et al. |
| 4,936,822 A | 6/1990 | Nemedi |
| 5,035,367 A | 7/1991 | Nojima |
| 5,106,487 A | 4/1992 | Nemedi |
| 5,110,060 A | 5/1992 | Lundquist |
| 5,135,178 A | 8/1992 | Strohmeyer |
| 5,236,139 A | 8/1993 | Radtke |
| 5,252,208 A | 10/1993 | Nemedi |
| 5,264,124 A | 11/1993 | Nemedi |
| 5,275,727 A | 1/1994 | Nemedi |
| 5,285,973 A | 2/1994 | Goforth et al. |
| 5,330,637 A | 7/1994 | Nemedi |
| 5,345,665 A | 9/1994 | Nemedi |
| 5,383,941 A | 1/1995 | Nemedi |
| 5,464,310 A | 11/1995 | Federhen |
| RE35,307 E | 7/1996 | Nemedi |
| 5,680,999 A | 10/1997 | Wada |
| 5,803,143 A | 9/1998 | Willis |
| 5,944,992 A | 8/1999 | Nemedi et al. |
| 6,079,645 A | 6/2000 | Henreckson et al. |
| 6,094,795 A | 8/2000 | Davenport |
| 6,125,992 A | 10/2000 | Dudley |
| 6,126,099 A | 10/2000 | Fachinger et al. |
| 6,129,851 A | 10/2000 | Nemedi et al. |
| 6,253,929 B1 | 7/2001 | Nemedi et al. |
| 6,375,841 B1 | 4/2002 | Nemedi et al. |
| 6,405,877 B1 | 6/2002 | Nemedi et al. |
| 6,540,087 B2 | 4/2003 | Nemedi et al. |
| 6,572,779 B2 | 6/2003 | Nemedi et al. |
| 7,028,935 B2 | 4/2006 | Nemedi |
| 7,175,119 B2 | 2/2007 | Nemedi |
| 7,467,755 B2 | 12/2008 | Nemedi |
| 9,855,564 B2 * | 1/2018 | Hales ............... B03C 1/0332 |
| 2003/0178518 A1 | 9/2003 | Nemedi |

FOREIGN PATENT DOCUMENTS

| | | |
|---|---|---|
| DE | 2636989 | 2/1978 |
| JP | 53-062271 | 6/1978 |
| SU | 814485 | 3/1981 |
| SU | 1535655 | 1/1990 |
| SU | 1669591 | 8/1991 |
| SU | 1722617 | 3/1992 |

OTHER PUBLICATIONS

"Two-Stage Scrap Metal Shredder", U.S. Appl. No. 08/785,645, filed 1997—abandoned, 22 pages.

\* cited by examiner

PARTS SEPARATOR

BACKGROUND

This patent is directed generally to a parts separator for use with a centrifugal separator, and, more particularly, to a parts separator having a magnetic separator disposed within the parts separator.

In the course of machining operations, scrap materials are generated. These scrap materials may be generally referred to as wet chips or wet chip material, which material includes a solid component and a fluid (lubricant) component. This scrap may be in the form of relatively small wet chips, also referred to as granular wet chips, stringy pieces of wet chips and bales of wet chip material.

Conventionally, wet chip materials are conveyed from one or more machine stations to a centrifugal separator station where the wet chip material is centrifugally separated into dry chips and fluid. This is done so that the dry chips may be reclaimed, and the fluid reclaimed or sent for disposal.

However, the material produced as a consequence of the machining operations may not be of homogenous metallurgical composition. That is, it is known to make castings that include a first component made of aluminum and a second component made of iron, for example. In one particular example, an iron cylinder sleeve may be cast into an aluminum engine block. When the engine block is machined, the wet chip material may be substantially aluminum, but it will also include a ferrous component.

The conventional process has been to separate the lubricant from the wet chips, and then process the wet chips to remove the ferrous contamination. The removal of the iron from the aluminum is particularly complicated by the fact that the amount of ferrous material might be an extremely small faction of the dried chip material collected from the centrifugal separator station. As a result, the type of magnetic separation equipment required to process the collected can be bulky and expensive, and the process is time consuming.

BRIEF DESCRIPTION OF THE DRAWINGS

It is believed that the disclosure will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

DETAILED DESCRIPTION OF VARIOUS EMBODIMENTS

Figure 1:
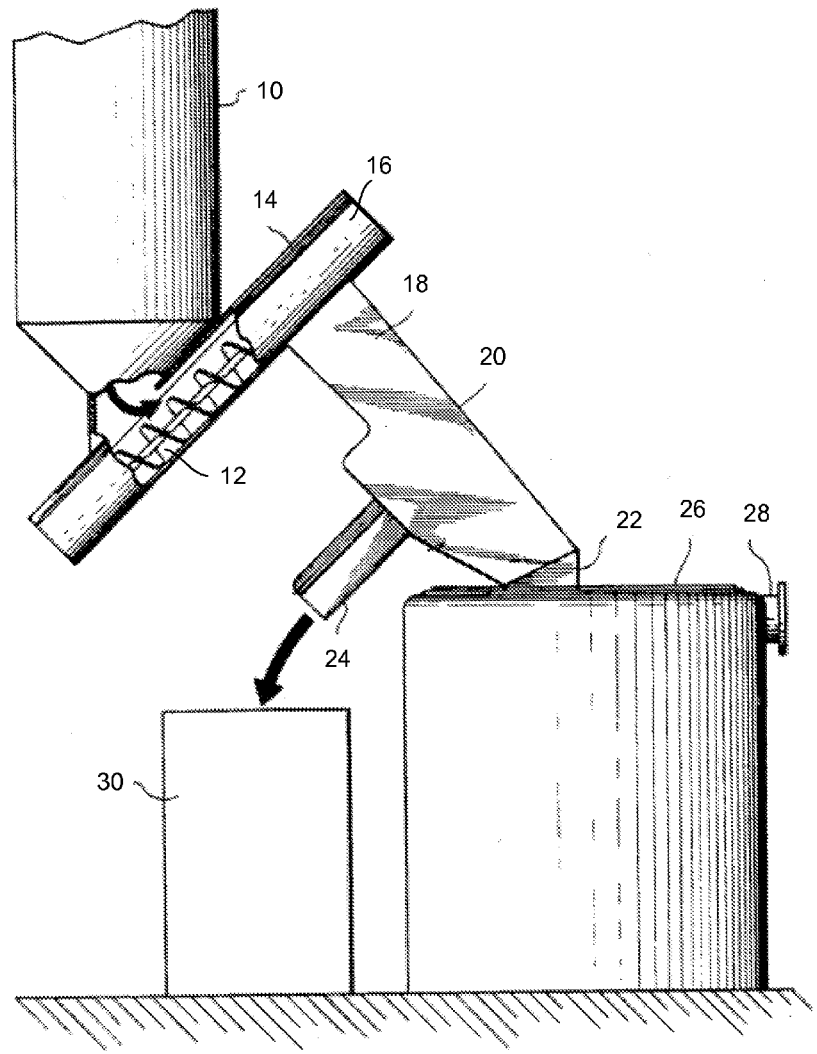
FIG. 1 is a side view of a material separation system according to an embodiment of the present disclosure including a parts separator connected at a first end to a feeder and at a second end to a centrifugal separator, with the motor removed.

Referring to FIG. 1, a mixture of scrap materials, such as metal chips of varying weights, lubricant and relatively large, unwanted, pieces of metal and other debris, is received in a hopper 10. While reference is made herein to lubricant, it is appreciated the term is used in its broad sense to include any liquid material to be separated from the metal chips and includes lubricating oils, fluids or the like. The other debris mentioned above may include bolts, nuts, tools or tool fragments, for example.

The material from the hopper 10 is discharged into a first end 12 of a conventional feeder (or conveyor) 14. For example, the feeder 14 may be an auger-type conveyor. The feeder 14 transports the mixture to a second, upper end 16 of the feeder 14, and discharges the material into a first, inlet end (or port) 18 of a parts separator 20. The inlet end 18 of the separator 20 may be flanged or otherwise adapted to connect to a flange of the feeder 14 at the end 16. The mixture passes through the parts separator 20, and exits the parts separator 20 through one of two outlet ends (or ports) 22, 24.

Metal chips and lubricant exit through the outlet end 22 enter a centrifugal separator 26. In the separator 26, the chips and lubricant first drop to the bottom of a rotatable drum or rotor having a plurality of radially positioned, blades attached thereto. Rotation of drum and blades causes the chips and lubricant to rotate as well. A centrifugal force is generated to cause the chips and lubricant to move upwardly along the interior of the side wall of the rotor. As the chips and lubricant reach a screen, the lubricant is separated from the chips, passing through the screen for collection in a first annular chamber for discharge through a suitable conduit. The metal chips continue upward, partly in response to the centrifugal force already acquired and partly in response to air drawn through the separator 26, past the screen and into a second annular chamber. The chips then are thrown and blown out of the second annular chamber through an exit port 28 which is connected to a suitable chip receiver. Examples of a suitable centrifugal separator 26 may be found in U.S. Pat. Nos. 4,936,822, 5,252,208, 5,264,124, 5,275,727, 5,944,992, and 6,129,851, all of which patents are incorporated by reference herein for all purposes.

On the other hand, the heavier, undesired materials and other debris exit the separator through exit end 24 into a hopper 30. The materials received in the hopper 30 may be transported for further processing or disposal.

As mentioned above, the wet chip material may include both an aluminum and a ferrous component. Even if the lubricant is efficiently removed from the chips, additional post-processing must be performed to separate the non-ferrous (e.g., aluminum) and ferrous materials. The amount of material collected for further processing makes the post-processing expensive and time-consuming.

It has been recognized, however, that the parts separator 20 represents an advantageous location to perform the separation of the ferrous and non-ferrous materials. That is, the amount of wet chip material passing by any particular location in the parts separator 20 is relatively small, especially when the amounts of dry chip material produced and collected from the centrifugal separator 26 are taken into consideration. Because of the relatively small amount of material passing by any location within the parts separator 20, it is believed that an applied magnetic field will have a greater degree of success in separating the ferrous material from the non-ferrous material, even if the ferrous material represents a significantly small fraction of the material passing by that particular location. Thus, the parts separator 20 according to the present disclosure includes a magnetic separator between the inlet 18 and outlet ends 22, 24 to remove materials that can be magnetized, while at the same time providing multi-stage pneumatic separation.

In particular, the separator 20 includes a first chute 50 that has a first, inlet section 52 that extends in a first direction from the end 18 and defines an inlet opening 54 at the inlet end 18, and a second, outlet section 56 that extends in the first direction and defines an outlet opening 58 at the outlet end 22 adapted to be coupled to the centrifugal separator 26. Disposed between the inlet and outlet sections 52, 56 is an opening 60, which may also be referred to as the heavy material drop-out opening 60.

The opening 60 is located in a bottom wall 62 of the chute 50 where the first and second chute sections 52, 56 meet, and is contiguous to the first and second sections 52, 56. A second chute 64 is disposed below the opening 60, and may be attached at a first end 66 to the opening 60 such that the second chute 64 is in communication with the first chute 50. The second end 68 of the chute 64 defines the second exit end 24 of the separator 20.

As the material that entered the separator 20 passes the opening 60, the mixture is entrained in an air flow having an air pressure substantially different than normal atmospheric air pressure. The air flow is generated by centrifugal separator 26, in that air is pulled or drawn into the centrifugal separator 26 and a negative air pressure is generated in chute 50. To this end, the centrifugal separator 26 may be designed with a motor having sufficient horsepower to generate movement of rotor and blades of the centrifugal separator 26 to provide the desired air flow past the opening 60 as a negative pressure occurs within the chute 50. The change in air flow immediately below the opening 60 serves to cause the lighter metal chips and lubricant to pass into the second, outlet section 56 whereas heavier, undesired materials fall by gravity through the opening 60 into the second chute 64.

The separator 20 is thus a multi-stage separation apparatus in that it allows for the components of the mixture to be separated in several stages, decreasing the possibility of damage to the centrifugal separator 26 located downstream of the separator 20. Moreover, each phase of separation is readily viewable by appropriate personnel, while the system is in operation, so that it can readily be determined whether efficient separation occurs and any necessary adjustments can be relatively easily made.

The separator 20 (and in particular, the chute 50) may also include one or more baffle plates disposed within the first and second chute sections 52, 56 to assist in directing materials through parts separator 20. The baffle plates may be fixed or securely attached (e.g., welded) in the first and second chute sections 52, 56; see for example, baffle plates 70, 72. Alternatively, the baffle plates may be moveable (e.g., translatable) to the surfaces of the chute 50 (including other baffle plates) to vary the dimension of the passages defined within the chute sections 52, 56. For example, a baffle plate 74 can be mounted for adjustment on a surface 76 of the baffle plate 70.

Baffle plates 70, 72, 74 can be positioned to either increase or decrease the open area surrounding the opening 60, as well as the size of the passage leading to the second chute section 56. As a consequence, the size and amount of solid materials and lubricant passing through the outlet ends 22, 24 of the separator 20 may be varied in accordance with the pneumatic operation of the separator 20.

As mentioned above, the separator 20 may also include a magnetic separator (in particular, a magnetic drum) 100 further separate undesirable materials prior to the centrifugal separator 26. The magnetic drum 100 may be disposed at or adjacent to the drop-out opening 60. As illustrated, the magnetic drum 100 is also disposed outside the chute 50. In fact, the magnetic drum 100 is disposed slightly below the bottom wall 62 of the chute 50.

The magnetic drum 100 may be disposed for rotation on a rotatable shaft, or may be one in the same with shaft (i.e., formed integrally therewith). As the drum 100 rotates about its axis 102, material is removed from the drum 100 by a scraper 104. In particular, an end or edge 106 of the scraper 104 abuts an outer surface 108 of the drum 100, and the motion of the surface 108 relative to the fixed edge 106 of the drum 100 causes the material carried on the surface of the drum to fall into the chute 64.

Figure 2:
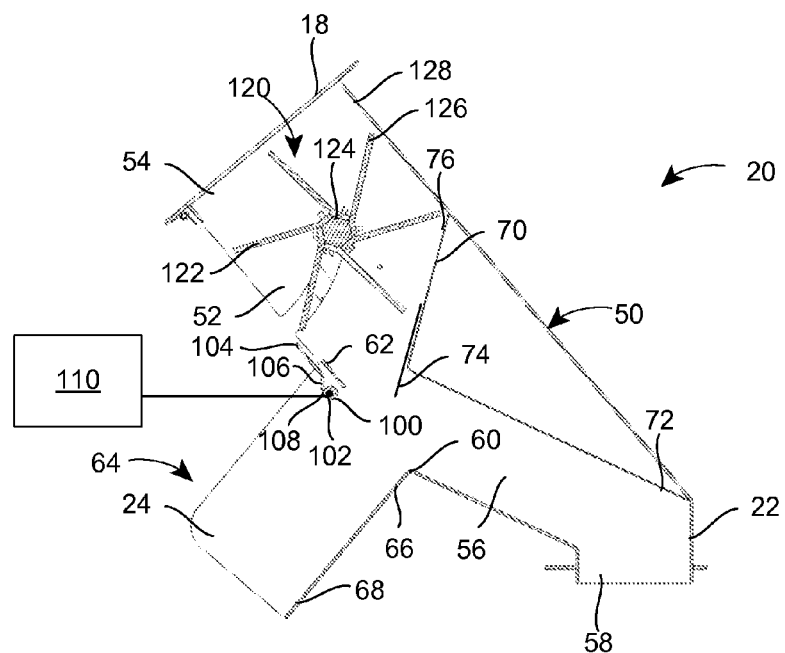
FIG. 2 is a cross-sectional view of the parts separator of FIG. 1 illustrating the rotary air seal and the magnetic drum.

As is also visible in FIG. 2, a power source/controller 110 may be coupled to the magnetic separator or drum 100. The power source/controller 110 may provide electrical current to the magnetic drum 100 to generate a magnetic field. To this end, the source/controller 110 may include a battery or may be connected to mains electricity.

In addition to the structures of the separator 20 used to pneumatically or magnetically separate the materials passing through the separator 20, the separator 20 may include other features that provide additional advantages.

As one example, the separator 20 may include an air seal (in particular, a rotary air seal) 120 to limit the passage of air through the separator 20. The rotary air-seal 120 is disposed in the first chute section 52, and is disposed above and contiguous to the drop-out opening 60. The rotary air-seal 120 has a plurality of blades or paddles 122 connected to hub 124 which may be disposed for rotation on rotatable shaft, or may be one in the same with the shaft (i.e., formed integrally therewith). The blades 122 may be equally spaced about the hub 124. Outer edges 126 of the blades 122 cooperate with an inner surface 128 of the chute 50 to create an air-seal or lock to preclude any substantial amount of air from being pulled into centrifugal separator 26. It will be recognized that the air seal illustrated in FIG. 2 is merely exemplary, and other air seals which may be suitable for use in the separator 20 are illustrated in U.S. Pat. No. 5,106,487, which is incorporated by reference for all purposes herein.

Figure 3:
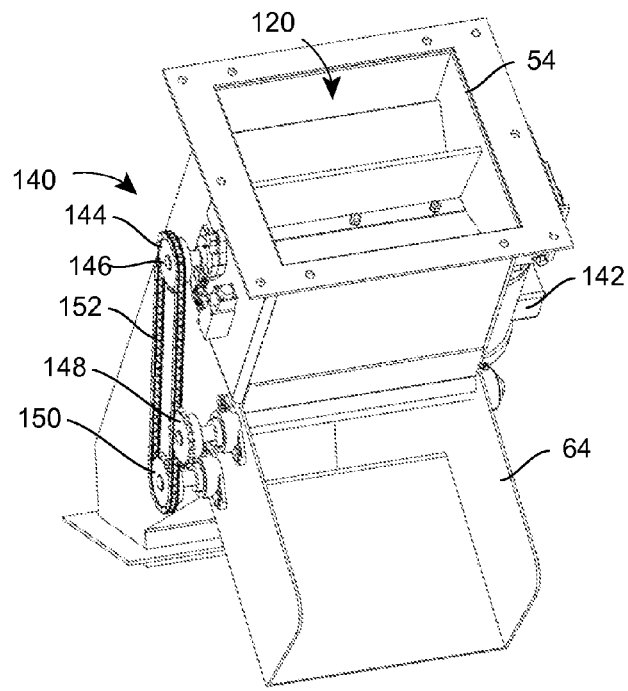
FIG. 3 is a perspective view of the parts separator of FIG. 1 including a drive used to operate the rotary air seal and the magnetic drum.

As illustrated in FIG. 3, the separator 20 may include a drive 140 to cause both the rotary seal 120 and the magnetic drum 100 to rotate. In particular, the drive 140 includes a motor 142. The motor 142 is coupled to the hub/shaft 124 of the air seal 120 at one end. A sprocket 144 is attached to the other end 146 of the shaft 124, and is used to drive two other sprockets 148, 150 via a drive chain 152, the drive chain 152 meshing with the sprockets 144, 148, 150. The first sprocket 148 is coupled to the drum 100. The second sprocket 150 may function as an idler; alternative, according to certain embodiments, the second sprocket 150 may be coupled to a second magnetic drum, which drum may have an associated scraper and may also be disposed at the opening 60.

Figure 4:
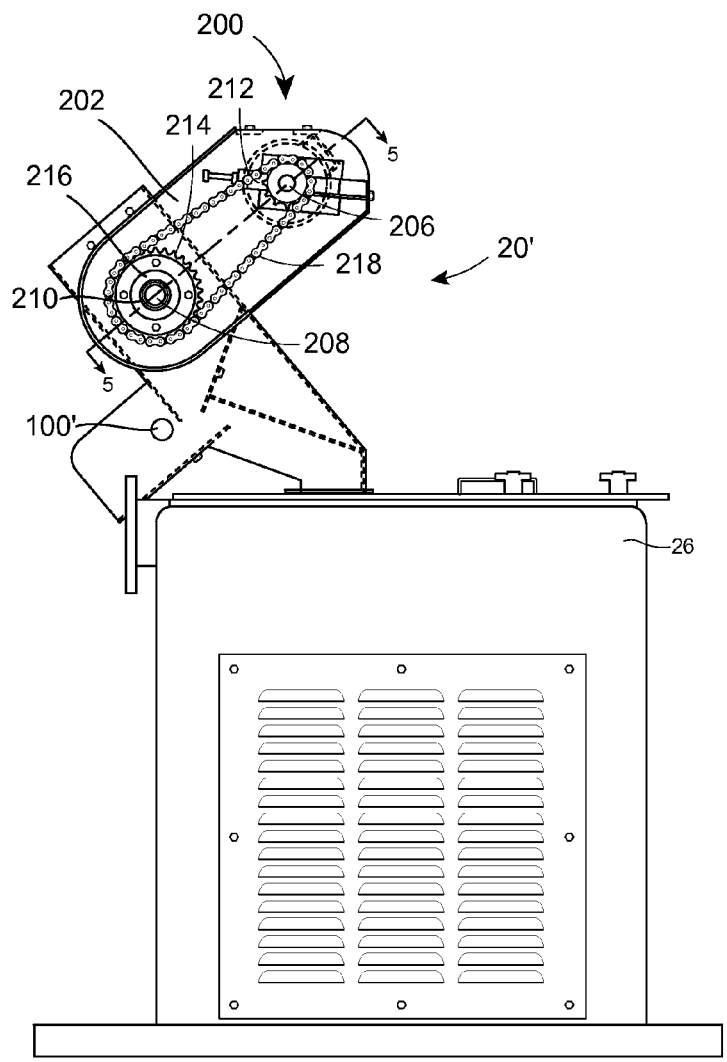
FIG. 4 is a side view of a material separation system according another embodiment of the present disclosure including a parts separator connected to a centrifugal separator, with one wall of a housing removed to expose a drive assembly.
Figure 5:
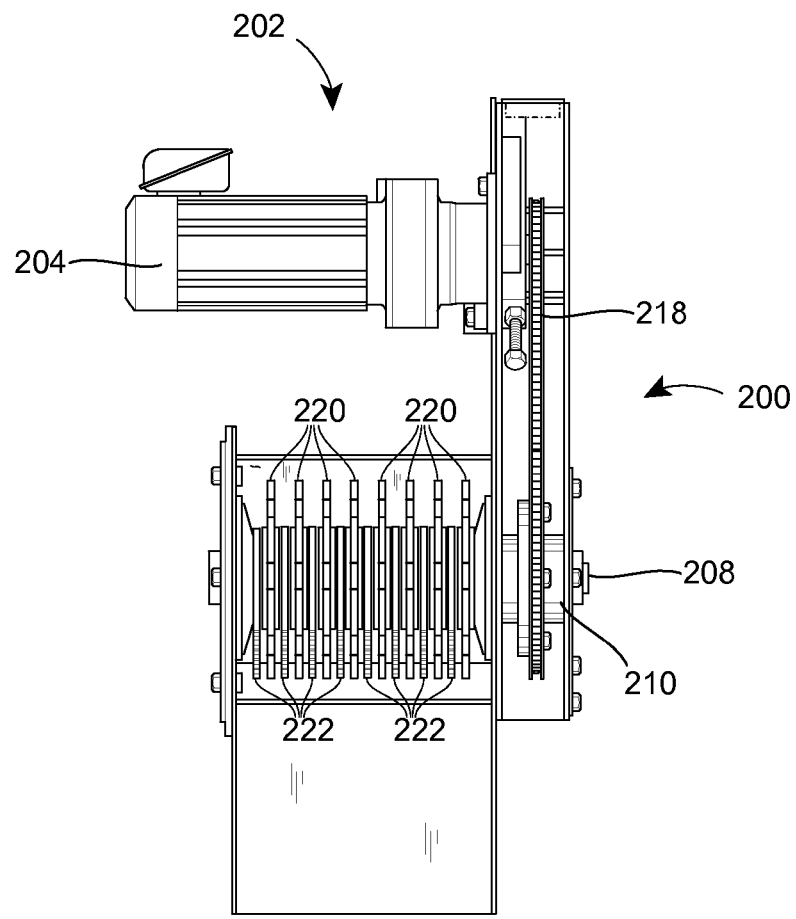
FIG. 5 is a cross-sectional view of the parts separator of FIG. 4 taken along line 5-5 in FIG. 4 illustrating the shredder and the magnetic drum.

As a further example, FIGS. 4 and 5 illustrate a parts separator 20' that includes a shredder 200, instead of the air seal 120, disposed in the first chute section 52. As illustrated in FIG. 4, the magnetic separator 100' may be positioned in the separator 20' so as to provide similar advantages in this setting as well. The shredder 200 may be as illustrated in U.S. Pat. No. 7,467,755, which is incorporated by reference herein for all purposes.

Generally, the shredder 200 includes a drive assembly 202 with a motor 204 having a shaft 206 (see FIGS. 4 and 5). Positioned below the motor 204 is a fixed shaft 208, and a cylindrical rotor 210 is disposed over the fixed shaft 208. A first sprocket 212 is keyed to the motor shaft 206. A second sprocket 214 is bolted to the sprocket mounting plate 216, the latter being welded to the rotor 210. A drive chain 218 connects the sprockets 212, 214 whereupon activation of the motor 204 and the sprocket chain assembly, the rotor 210 rotates. The shaft 208 is fixed in place and does not rotate.

As best seen in FIG. 5, a plurality of spaced shredder wheels 220, each wheel including spaced shredder arms extending outwardly from the wheel 220, are attached (e.g., keyed) at different locations to rotor 210. Each shredder arm may have sides formed or grooved inwardly to define a concave surface. The shredder wheels 220 define a shredder assembly. In addition, a plurality of spaced shredder comb members 222 is mounted or seated on rotor 210, and is positioned so that a comb member 222 is adjacent a shredder wheel 220. The comb member have comb arms that are preferably serrated along substantially the length of one side of comb arm. The shredder comb members 222 also define a shredder assembly.

Each comb member 222 is adapted to be inserted on rotor 210, and seats on the rotor at the location of a comb member opening; however, the comb members 222 are free from rotation (i.e., do not rotate) with rotor 210. That is, each of the comb members 222 is fixedly disposed within the first chute section 52 whereby the comb members 222 each remain stationary during a shredding operation. Accordingly, shredder wheels 220 rotate relative to fixed adjacent comb members 222 and together, the shredder wheels 220 and comb members 222 cooperate to shred or otherwise cut wet chip material passing through shredder apparatus 100.

Although the preceding text sets forth a detailed description of different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

What is claimed is:

1. A parts separator comprising:
   a linear first chute extending in a first direction and having an inlet section defining a wet chip inlet opening for receiving a mixture of light and heavy wet chips, an outlet section defining a wet chip outlet opening adapted to be coupled to a centrifugal separator and a drop-out opening disposed between the inlet and outlet sections, the drop-out opening disposed below the wet chip inlet opening in a direction of gravity and the wet chip outlet opening disposed below the drop-out opening in the direction of gravity;
   a linear second chute connected to the first chute and disposed below the drop-out opening, extending in a second direction transverse to the first direction; and
   a magnetic separator disposed in the second chute and adjacent the drop-out opening.

2. The parts separator according to claim 1, wherein the first chute has a bottom wall in which the drop-out opening is disposed, the magnetic separator disposed below the bottom wall.

3. The parts separator according to claim 1, wherein:
   the magnetic separator comprises a magnetic drum and a scraper, an edge of the scraper abutting an outer surface of the magnetic drum to remove material therefrom.

4. The parts separator of claim 1, further comprising a centrifugal separator creating a negative pressure resident in the first chute and creating a linear air flow entraining the light wet chips from the drop-out opening, through the outlet section, and out of the wet chip outlet opening, while the heavy wet chips drop from the first chute through the drop-out opening and into the second chute.

5. A parts separator comprising:
   a chute having an inlet section defining a wet chip inlet opening, an outlet section defining a wet chip outlet opening adapted to be coupled to a centrifugal separator and a drop-out opening disposed between the inlet and outlet sections;
   a magnetic separator disposed adjacent the drop-out opening; and
   a shredder apparatus disposed within the inlet section;
   the shredder apparatus comprising a first shredder assembly having a plurality of first shredder members; a second shredder assembly having a plurality of second shredder members; the first and second shredder members being adapted to cooperate with one another to shred wet chip materials; and,
   a drive assembly connected to one of the shredder assemblies for actuating the shredder members of the one of the shredder assemblies relative to the shredder members of the other of the shredder assemblies whereby the first and second shredder members cooperate to shred wet chip materials within the inlet section.

6. The parts separator according to claim 5, wherein:
   the magnetic separator comprises a magnetic drum and a scraper, an edge of the scraper abutting an outer surface of the magnetic drum to remove material therefrom.

7. The parts separator according to claim 5, wherein:
   the shredder apparatus comprises a fixed shaft and a rotatable rotor disposed over the fixed shaft,
   the first shredder members are attached to and rotatable with the rotor and the second shredder members are seated on but free from rotation with the rotor, the drive assembly coupled to the rotor to rotate the rotor relative to the fixed shaft.

8. The parts separator according to claim 7, wherein each of the second shredder members is fixedly disposed within the inlet chute section whereby each of the second shredder members remains stationary during a shredding operation.

9. A system comprising:
a centrifugal separator; and
a parts separator including a linear first chute extending in a first direction and having an inlet section defining a wet chip inlet opening for receiving a mixture of light and heavy wet chips, an outlet section defining a wet chip outlet opening coupled to the centrifugal separator and a drop-out opening disposed between the inlet and outlet sections, the drop-out opening disposed below the wet chip inlet opening in a direction of gravity and the wet chip outlet opening disposed below the drop-out opening in the direction of gravity, a linear second chute connected to the first chute and disposed below the drop-out opening and extending in a second direction transverse to the first direction, and a magnetic separator disposed in the second chute and adjacent the drop-out opening.

10. The system according to claim 9, wherein the chute has a bottom wall in which the drop-out opening is disposed, the magnetic separator disposed below the bottom wall.

11. The system according to claim 9, wherein:
the magnetic separator comprises a magnetic drum and a scraper, an edge of the scraper abutting an outer surface of the magnetic drum to remove material therefrom.

12. The system according to claim 9, wherein the parts separator includes a rotary air seal disposed within the inlet section,
the rotary air seal comprising a hub and a plurality of blades connected to the hub, the blades having outer edges that cooperate with an inner surface of the chute to create an air seal to preclude any substantial amount of air from being pulled into the centrifugal separator.

13. The system according to claim 12, wherein:
the magnetic separator comprises a magnetic drum and a scraper, an edge of the scraper abutting an outer surface of the magnetic drum to remove material therefrom.

14. The system according to claim 13, further comprising:
a motor coupled to the rotary air seal and the magnetic drum to rotate the rotary air seal and the magnetic drum.

15. The system according to claim 14, wherein the motor is coupled to the hub, a first sprocket is attached to the hub, and the magnetic drum is coupled to a second sprocket, and further comprising a drive chain that meshes with the first and second sprockets to rotate the magnetic drum.

16. The system according to claim 9, wherein the parts separator includes a shredder apparatus disposed within the inlet section;
the shredder apparatus comprising a first shredder assembly having a plurality of first shredder members; a second shredder assembly having a plurality of second shredder members; the first and second shredder members being adapted to cooperate with one another to shred wet chip materials; and,
a drive assembly connected to one of the shredder assemblies for actuating the shredder members of the one of the shredder assemblies relative to the shredder members of the other of the shredder assemblies whereby the first and second shredder members cooperate to shred wet chip materials within the inlet section.

17. The system according to claim 16, wherein:
the shredder apparatus comprises a fixed shaft and a rotatable rotor disposed over the fixed shaft,
the first shredder members are attached to and rotatable with the rotor and the second shredder members are seated on but free from rotation with the rotor,
the drive assembly coupled to the rotor to rotate the rotor relative to the fixed shaft.

18. The system according to claim 17, wherein each of the second shredder members is fixedly disposed within the inlet chute section whereby each of the second shredder members remains stationary during a shredding operation.

19. The system of claim 9, further comprising a negative pressure resident in the first chute generated by the centrifugal separator and creating a linear air flow entraining the light wet chips from the drop-out opening, through the outlet section, and out of the wet chip outlet opening, while the heavy wet chips drop from the first chute through the drop-out opening and into the second chute.

* * * * *